Figure 1:
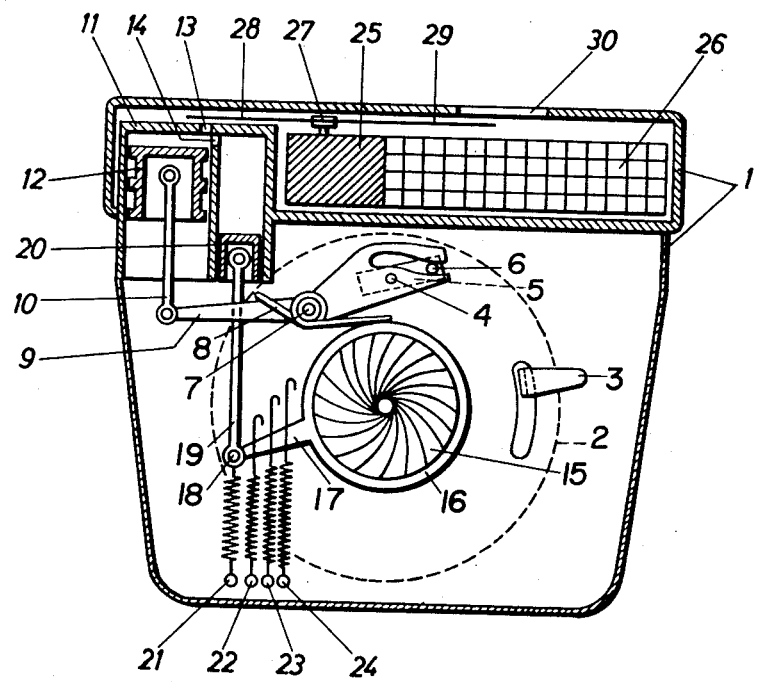

April 25, 1961  J. DURST  2,981,164
AUTOMATIC EXPOSURE REGULATING DEVICE
Filed June 29, 1959

INVENTOR.
JULIUS DURST
BY Connolly and Hutz
ATTORNEYS

United States Patent Office 2,981,164
Patented Apr. 25, 1961

2,981,164
AUTOMATIC EXPOSURE REGULATING DEVICE
Julius Durst, Bressanone, Italy, assignor to Julius Durst and Durst Soc. p.A., Fabbrica Macchine ed Apparecchi Fototecnici, Bolzano, Italy Filed June 29, 1959, Ser. No. 823,462
Claims priority, application Italy July 7, 1958
14 Claims. (Cl. 95—10)

This invention relates to an automatic exposure regulating device for photographic cameras and motion picture apparatus, and more particularly relates to such a device in which both the shutter speed and effective aperture are controlled.

In automatically controlling the exposure of a photographic camera, photoelectric exposure measuring devices have been used either for regulating the shutter speed or the effective aperture. Since the regulation of shutter speed requires that complicated auxiliary elements must be controlled by an exposure meter, it has been preferred to adjust the lens diaphragm which can more easily be controlled, particularly in motion picture cameras for regulating exposures. However, the range of indication of an exposure meter is far greater than the range of regulation of a camera shutter, and the range of regulation of a diaphragm for controlling the effective aperture of the camera lens is also limited.

When both the effective aperture and shutter speed could be regulated, the range of indication of an exposure meter is utilized to a far greater extent. In systems with follow-up devices, the indication of light intensity provided by the exposure meter is transferred to either the aperture regulating diaphragm or the shutter by means of a control member. However, there is no means of simultaneously regulating and coordinating the operation of the diaphragm and shutter. In automatically controlling exposures, there is a problem of separately varying the aperture and exposure time to coordinate them over the full range of exposures. With automatically controlled exposure regulators having a range of control, for example, from 1 second to 1/500 second, the aperture must be adjusted to provide very fast exposure times with sufficient depth of focus. Then when the ambient illumination is very small, the diaphragm must be opened to such an extent that the shutter mechanism provides its longest exposure times. However, if the light is so bright that even the fastest exposure time of the device is insufficient, the diaphragm must be closed.

An object of this invention is to provide an automatic exposure regulating device which can utilize the entire measuring range of an exposure meter.

Another object is to provide such a device in which both the exposure time and effective aperture are separately varied in a coordinated manner with the effective aperture being decreased as the shutter speed increases.

Still further an object is to provide such a device in which principal phases of variation of shutter speed are interspersed by principal phases of variation of effective aperture.

In accordance with this invention an actuating means connected to an adjustable diaphragm is automatically opened and closed as the shutter speed is automatically regulated by control of a shutter retarding device.

A certain program in regulation of the aperture and shutter speed can be described in accordance with the following. This program can be governed in accordance with the statistical observations made by photography experts to provide definite proportion between shutter speed and effective aperture under varying light conditions. In accordance with this program, four successive trends can be determined in passing from the dimmest to the brightest light.

Starting with the dimmest light with the lens diaphragm fully opened, the slowest shutter speed is used; and the shutter speed is then reduced with increasing light intensity. When the brightness increases still further, it is then preferred to start closing the diaphragm in favor of maintaining depth of focus. When the brightness increases so much that proper depth of focus can be maintained by, for example, the diaphragm, the shutter speed is then reduced again to prevent insufficient motional focus from being obtained. As the brightness increases still further to a maximum, it is only possible to reduce the exposure further by closing down upon the diaphragm.

The subject matter of German Patent 923,525 of this same inventor may be utilized in providing a practical embodiment of the aforementioned cycle of regulation.

The object of this present invention may accordingly be described as the provision of a practical embodiment of a program type automatic exposure control which makes it possible for a photographer to avoid the trouble of separately adjusting either the effective aperture or shutter speed and the necessity of manually performing adjustments in accordance with the indication of exposure indicating instruments.

In German Patent 923,525 is shown a control element operated by a photoelectric cell through a galvanometer in accordance with a function of brightness of ambient illumination which provides a variation in the cross section of flow through a suction pump. This suction pump which is connected with the shutter is given more or less air in accordance with the size of inlet formed by an exposure meter regulated valve at a given time to provide an impedance which varies as a function of brightness of the ambient illumination.

In accordance with this present invention an exposure-regulating device is connected to a shutter-retarding device and an actuating means for an adjustable diaphragm to permit the speed of the shutter and the opening of the aperture to be respectively separately controlled. A coordinating means acting between the shutter-retarding device and the actuating means causes the effective aperture to be decreased as the speed of the shutter increases. This coordinating means provides, for example, a program in which phases of adjustment of the shutter-retarding device are interspersed by principal phases of adjustment of the actuating means. This is achieved, for example, by applying varied forces in steps to the actuating means.

One type of embodiment of this invention includes a second piston and cylinder in addition to the first piston and cylinder shown in German Patent 923,525. A passageway connects these two cylinders, and the piston to the second cylinder is connected to an actuating means for adjusting the diaphragm of the lens. The first piston is connected to the shutter to provide an automatic shutter retarding device. A spring maintains the diaphragm-actuating piston in that limit of travel in which the greatest space is provided within its cylinder, namely in the bottom dead center position. The diaphragm in this position is accordingly maintained at its smallest aperture. When the shutter is released, the main piston moves through a suction stroke, and its impedance or retarding effect upon the running of the shutter is determined by the amount of air flowing into it. Simultaneously, the degree of vacuum created in the main cylinder is imparted to the second cylinder thereby opening the diaphragm attached to its cylinder against the action of the spring holding it closed. Since the vacuum is maintained substantially constant during this suction stroke, the diaphragm is maintained at a substantially definite aperture opening while the shutter is running off. An operative cycle having, for example, four zones or phases of different operation is provided by providing four incremental force-applying means associated with the diaphragm, for example, by applying four different spring forces to the diaphragm in such a way that the diaphragm control piston is maintained held substantially motionless in two of four phases throughout the range of variation of shutter speed.

Separate programs of aperture size and shutter speeds are accordingly brought about in a relatively simple manner by variation in vacuum of the mechanism retarding the shutter. Since each shutter speed corresponds to a substantially definite vacuum, the adjustable diaphragm is accordingly sucked thereby into the position coordinated therewith. However, in each separate phase of operation, neither the shutter speed nor the aperture opening seems absolutely constant because a variation in the shutter speed and accordingly the vacuum created thereby alters the aperture opening. In order to maintain one of these two regulating means substantially constant, individual cross-sectional flow passages are provided for the diaphragm control. A simple example of an automatic device for governing exposure is shown in German Patent 923,525 which, in accordance with this invention, is utilized in a unique manner to simultaneously automatically set the shutter speed and diaphragm in accordance with a substantially fixed cycle of operation. (See U.S. 2,800,844.)

It is accordingly advantageous to arrange this device in such a manner that the diaphragm is maintained closed by spring action when fastest shutter speeds are being provided. As the shutter speed decreases and the vacuum drawn in the retarding device increases, this overcomes the increasing resistance of the retarding springs applied to the diaphragm control.

Figure 2:
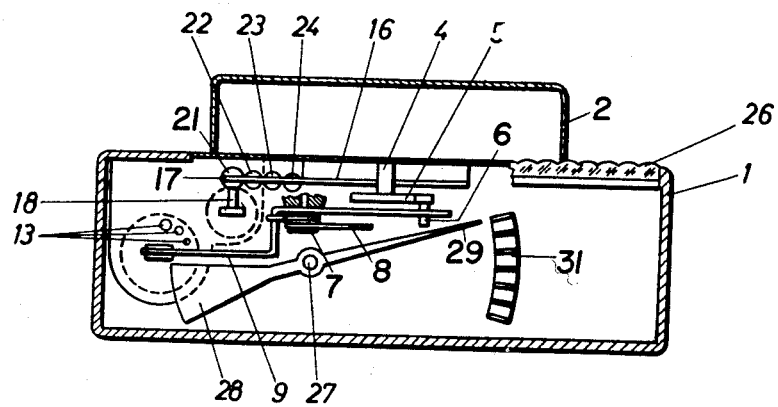

Novel features and advantages of the present invention will become apparent to one skilled in the art from a reading of the following description in conjunction with the accompanying drawings wherein similar reference characters refer to similar parts and in which:

Fig. 1 is a schematic cross-sectional view in elevation of one embodiment of this invention; and Fig. 2 is a plan cross-sectional view taken through an upper portion of the embodiment shown in Fig. 1.

In Figs. 1 and 2 is shown a housing 1 with a shutter mechanism 2 and release lever 3 mounted in its lower portion. Winding shaft 4 connected, for example, with the shutter blades (not shown) supports a rotating crank 5 upon which is mounted a crank pin 6. Crank pin 6 moves within a slot in the right hand arm of lever 9 which is rotatably mounted upon shaft 7 secured to housing 1. The left hand arm of lever 9 is connected by means of connecting rod 10 with piston 12. A compensating spring 8, for example of the torsion type, reacts in a counterclockwise direction upon lever 9. Cylinder block 11 within which piston 12 slides also encloses auxiliary piston 20 which is connected by pin 18 through connecting rod 19 to diaphragm adjusting lever 17. Lever 17 is part of an actuating means which moves the plates 15 through diaphragm ring 16. Diaphragm plates 15 are maintained by tension spring 21 attached to pin 18 urged towards the closed position, and auxiliary diaphragm actuating piston 20 is accordingly urged towards its bottom dead center position. Springs 22, 23 and 24 are part of an incremental force-applying means, and they are disposed in position to come successively into action to retard the movement of diaphragm lever 17 during its phase of operation to cause four substantially discrete phases of diaphragm adjustment.

Casing 1 also encloses an exposure-measuring means incorporating a photoelectric cell 26 connected to a galvanometer 25. Pointer 29 is mounted upon galvanometer shaft 27 and moves over a scale 31 which can be observed through window 30. A valve element 28 is incorporated upon the left hand side of pointer 29 and moves freely over suction regulating apertures 13 in the head of cylinder 11.

*Operation*

When shutter 2 is released by actuation of release lever 3, its wind shaft 4 runs off in a counterclockwise direction and accordingly moves double-armed lever 9 along with it through pin 6. This causes a suction stroke to be performed upon the downward movement of piston 12. Valve element 28 is moved in accordance with the ambient illumination detected by photoelectric cell 26 to cover predetermined inlet openings 13 to a predetermined degree which controls the vacuum drawn by piston 12 thereby controlling its retarding effect and accordingly the running-off speed of the winding shaft and the shutter speed as well. The degree of vacuum drawn by main piston 12 exerts through passageway 14 a vacuum upon piston 20 which lifts it accordingly. This moves diaphragm adjusting ring 16 to open the diaphragm to an extent which varies in accordance with the incremental resistances of the springs 21, 22, 23 and 24 which are successively brought into action.

During the dimmest light conditions, the shutter retarding effect of piston 12 is highest and the strongest vacuum is exerted upon piston 20. This causes piston 20 to move to its highest position against the combined force of all four springs thereby opening diaphragm plates 15 to their maximum effective aperture.

As the light increases in brightness, the shutter speed starts to increase with the lens opening held substantially constant as long as enough vacuum is provided to move it into engagement with all four springs. However, when the shutter speed increases sufficiently to disengage lever 17 from final spring 24, the effective aperture suddenly drops to the position governed by the first three springs 21, 22 and 23.

Then follows a second phase of speed regulation in which the shutter speed increases while effective aperture is held substantially constant until the vacuum drops below an amount sufficient to maintain lever 17 in engagement with penultimate spring 23. Diaphragm plates 15 are then moved to a third more closed phase in which it is held as the shutter speed increases still further until the vacuum drops below the intensity sufficient to maintain lever 17 engaged with third spring 22. Then the remaining spring 21 draws lever 17 into its lowest position providing minimum effective aperture where it remains as shutter retarding piston 12 is regulated throughout its fastest range of speeds. The aperture opening is accordingly varied in stepped increments as the shutter speed varies from minimum to maximum with ranges of shutter speed variation being accomplished between the steps of aperture variation.

What is claimed is:

1. An exposure-regulating device for a photographic camera having a shutter comprising a shutter-retarding device, exposure-measuring means for determining the degree of ambient illumination, transmission means operatively connecting said exposure-measuring means with said shutter-retarding device to permit the retarding effect of said shutter-retarding device to be regulated in accordance with the degree of ambient illumination, a connecting means coupling said shutter-retarding device with said shutter, an adjustable diaphragm disposed in the path of light rays passing into the aperture of said camera, actuating means connected to said adjustable diaphragm for moving said adjustable diaphragm throughout its operative range, coupling means operatively connecting said actuating means with said shutter-retarding means for applying an actuating force which is a function of the retarding effect exerted by said retarding device to cause said actuating means to provide decreasing apertures as the shutter speed is allowed to increase by adjustment of said shutter-retarding means, variable impedance means being connected to said actuating means for imposing varying impedances upon said actuating means over its range of movement to properly coordinate said opening of said diaphragm with various phases of speed of said shutter, and a cycle of shutter speed and aperture setting being provided by said variable impedance means which follows a pattern wherein adjustment of aperture opening varies incrementally over the range of shutter speeds.

2. An exposure-regulating device as set forth in claim 1 wherein said variable impedance means is arranged to vary in four steps.

3. An exposure-regulating device as set forth in claim 1 wherein said variable impedance means is provided by springs of varied characteristics, and means are provided for successively causing said springs to exert their force in steps upon said actuating means.

4. An exposure-regulating device as set forth in claim 3 wherein said springs are arranged to successively disengage from said actuating means as the shutter speed increases to cause said aperture opening to vary in substantially discrete steps over the range of shutter speed variation.

5. An exposure-regulating device for a photographic camera having a shutter comprising a shutter-retarding device, exposure-measuring means for determining the degree of ambient illumination, transmission means operatively connecting said exposure-measuring means with said shutter-retarding device to permit the retarding effect of said shutter-retarding device to be regulated in accordance with the degree of ambient illumination, a connecting means coupling said shutter-retarding device with said shutter, an adjustable diaphragm disposed in the path of light rays passing into the aperture of said camera, actuating means connected to said adjustable diaphragm for moving said adjustable diaphragm throughout its operative range, coupling means operatively connecting said actuating means with said shutter-retarding means for applying an actuating force which is a function of the retarding effect exerted by said retarding device to cause said actuating means to provide decreasing apertures as the shutter speed is allowed to increase by adjustment of said shutter-retarding means, said shutter-retarding device and said actuating means each incorporating a piston disposed within a cylinder, and a passageway connecting said cylinders to permit a change in volume within the cylinder of the retarding device to energize said actuating device and accordingly vary said adjustable diaphragm.

6. An exposure-regulating device for a photographic camera having a shutter comprising exposure-measuring means for indicating the degree of ambient illumination, a shutter-retarding device connected with said shutter, an adjustable diaphragm disposed in the path of light rays passing into the aperture of said camera, actuating means connected to said adjustable diaphragm for moving it throughout its operative range, coupling means connecting said exposure-measuring means to said shutter-retarding device and to said actuating means to permit the speed of said shutter and the opening of said aperture to be respectively controlled, a coordinating means operatively associated with said shutter-retarding device and said actuating means for providing a coordinated program for said shutter and said aperture in which the effective aperture is decreased as the speed of said shutter increases, and said coordinating means being constructed and arranged to provide a program in which phases of adjustment of said shutter-retarding device are interspersed by phases of adjustment of said actuating means.

7. An exposure-regulating device as set forth in claim 6 wherein said coordinating means includes incremental force-applying means associated with said actuating means for applying varied forces in steps to said actuating means to cause said interspersion of phases of adjustment.

8. An exposure-regulating device as set forth in claim 7 wherein said incremental force-applying means is comprised of a series of springs of varying strength, and linking means connects said springs with said actuating means in a manner which applies them successively to said actuating means at predetermined phase intervals.

9. An exposure-regulating device for a photographic camera having a shutter comprising exposure-measuring means for indicating the degree of ambient illumination, a shutter-retarding device connected with said shutter, an adjustable diaphragm disposed in the path of light rays passing into the aperture of said camera, actuating means connected to said adjustable diaphragm for moving it throughout its operative range, coupling means connecting said exposure-measuring means to said shutter-retarding device and to said actuating means to permit the speed of said shutter and the opening of said aperture to be respectively controlled, a coordinating means operatively associated with said shutter-retarding device and said actuating means for providing a coordinated program for said shutter and said aperture in which the effective aperture is decreased as the speed of said shutter increases, said coupling means connecting said exposure-measuring means with said shutter-retarding device, and said coordinating means being constructed and arranged to permit the movement of said actuating means to be governed by the operation of said shutter-retarding means.

10. An exposure-regulating device as set forth in claim 9 wherein said shutter-retarding means and said actuating means are each comprised of pistons disposed to slide within cylinders, said coupling means includes a valve controlling said cylinder of said shutter-retarding means, said valve being movably mounted upon said exposure-measuring device, and said coordinating means including a passageway between said cylinders to permit the relative movements and conditions of said respective cylinders to be transmitted to each other.

11. An exposure-regulating device as set forth in claim 10 wherein incremental force-applying means is operatively associated with said actuating means in a manner which applies forces in varying steps of strength upon said actuating means to thereby cause successive substantially discrete phases of adjustment of said actuating means interspersed by phases of adjustment of said shutter-retarding device.

12. An exposure-regulating device as set forth in claim 11 wherein said incremental force-applying means is comprised of a series of springs operatively associated with said actuating means in a manner which imposes their effect thereon in discrete steps of varying strength in accordance with the phase of movement of said actuating means.

13. An exposure-regulating device as set forth in claim 12 wherein one of said springs is permanently connected with said actuating means to provide a minimum aperture opening when a predetermined shuter speed is exceeded.

14. An exposure-regulating device as set forth in claim 13 wherein said permanently-connected spring resiliently holds said piston of said actuating means cylinder in the bottom dead center position.

References Cited in the file of this patent

UNITED STATES PATENTS

| | | |
|---|---|---|
| 2,187,953 | Schmidt | Jan. 23, 1940 |
| 2,780,971 | Fahlenberg | Feb. 12, 1957 |
| 2,800,844 | Durst | July 30, 1957 |
| 2,868,095 | Gebele | Jan. 13, 1959 |
| 2,885,938 | Durst | May 12, 1959 |